United States Patent [19]

Lumelsky et al.

[11] Patent Number: 4,994,912

[45] Date of Patent: Feb. 19, 1991

[54] AUDIO VIDEO INTERACTIVE DISPLAY

[75] Inventors: Leon Lumelsky, Stamford, Conn.; Alan W. Peevers, Peekskill, N.Y.

[73] Assignee: International Business Machines Corporation, Armonk, N.Y.

[21] Appl. No.: 314,623

[22] Filed: Feb. 23, 1989

[51] Int. Cl.[5] .............. H04N 7/01

[52] U.S. Cl. .............. 358/140; 358/22; 358/230

[58] Field of Search .............. 358/11, 22, 183, 181, 358/230, 903, 140, 143; 340/720, 721, 723, 732, 744, 745, 747, 750

[56] References Cited

U.S. PATENT DOCUMENTS

| | | | |
|---|---|---|---|
| Re. 32,201 | 7/1986 | Bradley | 340/750 |
| 4,282,546 | 8/1981 | Reitmeier | 358/183 |
| 4,317,114 | 2/1982 | Walker | 358/22 |
| 4,357,624 | 11/1982 | Greenberg | 340/721 |
| 4,599,611 | 7/1986 | Bowkes et al. | 358/22 |
| 4,631,588 | 12/1986 | Barnes et al. | 358/22 |
| 4,639,721 | 1/1987 | Eto et al. | 340/747 |
| 4,639,765 | 1/1987 | D'Hont | 358/22 |
| 4,660,070 | 4/1987 | Nishi et al. | 358/22 |
| 4,663,617 | 5/1987 | Stockwell | 340/721 |
| 4,680,634 | 7/1987 | Nanba et al. | 358/903 |
| 4,710,873 | 12/1987 | Breslow et al. | 358/903 |
| 4,739,405 | 4/1988 | Sumida | 358/140 |
| 4,777,486 | 10/1988 | Abraham et al. | 340/747 |
| 4,789,854 | 12/1988 | Ishii | 358/22 |
| 4,812,909 | 3/1989 | Yokobayashi et al. | 358/183 |
| 4,831,441 | 5/1989 | Ando | 358/11 |
| 4,851,826 | 7/1989 | Davis | 340/723 |
| 4,851,909 | 7/1989 | Noske et al. | 358/143 |
| 4,855,813 | 8/1989 | Russell et al. | 358/183 |
| 4,862,154 | 8/1989 | Gonzalez-Lopez | 340/747 |
| 4,862,156 | 8/1989 | Westberg et al. | 340/744 |
| 4,866,520 | 9/1989 | Nomura et al. | 358/22 |
| 4,870,406 | 9/1989 | Gupta et al. | 340/744 |

*Primary Examiner*—Tommy P. Chin
*Attorney, Agent, or Firm*—Jack M. Arnold

[57] ABSTRACT

A method and apparatus for synchronizing two independent rasters, such that a standard TV video and a high resolution computer generated graphics video may each be displayed on a high resolution graphics monitor. This is accomplished utilizing dual frame buffers. A TV frame buffer, comprises a dual port VRAM, with the serial and random ports operating asynchronously. The primary port receives incoming TV video synchronously as it comes in, and the secondary port reads the TV video out synchronously with the high resolution graphics monitor. A high resolution frame buffer in a computer is utilized to store high resolution graphics which is read out synchronously with the high resolution graphics monitor. A switching mechanism selects which of the TV video and the high resolution graphics video is to be displayed at a given time. The TV frame buffer includes an on screen and off screen portion. The computer provides computer data, including high resolution graphics data and audio data to the TV frame buffer, with the graphics data being stored in the on screen portion and the audio data being stored in the off screen portion. The audio data is read out to an audio circuit for replay. The graphics data is combined with the TV video for purposes of windowing.

10 Claims, 14 Drawing Sheets

AUDIO VIDEO INTERACTIVE DISPLAY

FIELD OF INVENTION

The invention is in the field of display devices, and specifically is directed to an audio video interactive display device in which two independent rasters are synchronized, such that a standard TV video and a high resolution computer generated graphics video may each be displayed in different combinations on a high resolution graphics monitor. Computer generated audio may be played in conjunction with the display on the high resolution graphics monitor.

BACKGROUND OF THE INVENTION

One of the difficulties encountered when displaying motion video from a standard (e.g. NTSC) video source on a high-resolution graphics screen is that of synchronizing the two independent "rasters". There is no inherent relationship between the timing (synchronization) of the two independent sources. If one were to try to use a conventional memory architecture, it would be extremely difficult to synchronize the write operation, which is synchronous with the incoming video, with the read operation, which must be synchronous with the high-resolution display on which the video is ultimately presented.

Another challenge is presented by the high speed with which the video information must be manipulated in order to achieve full-motion video performance. Attempting to do this with a conventional display controller design risks having inadequate performance.

Yet another challenge is presented by the fact that the manner in which television signals are displayed is fundamentally different from the method used by most high-resolution displays. The inherently interlaced characteristic of the incoming video in TV information must be eliminated in order to present it on the non-interlaced high-resolution graphics screen. Several possibilities exist for solving this problem, each having relative advantages and disadvantages.

SUMMARY OF THE INVENTION

According to the present invention, a workstation-based frame buffer is intended to add full-motion, full-color, video and medium-to-high quality stereo audio to a personal workstation environment. It supports the mixing of this motion video with the high-resolution graphics of the host computer, so that video "windows" can be placed on the high resolution screen. The source of video can any standard video source, such as a video camera, an optical videodisc player, a VCR, etc. Many video formats are supported, including, PAL, NTSC, SECAM, SVHS, etc.

The audio section of the invention allows real time stereo audio playback and recording from the host. This audio processing is completely independent of the video capture process thus allowing the user complete control over the audio portion of a multi-media application. For example, a user may select from one of several "soundtracks" to accompany a given video presentation. One application of this feature could be the release of multilingual material, where the audio/voice information is shipped in many languages, with the user selecting whichever language is preferred.

There are three major ideas that are incorporated into the approach taken to solve the technical problems that are presented. The combination of these ideas yield a unique solution for smoothly integrating digital video and audio within a host workstation environment

TIME BASE CORRECTION

The problem of synchronizing the incoming TV video with the high-resolution graphics output from the host can be solved using the unique dual-port properties of VRAM technology. The secondary (serial) port of these special-purpose VRAMs can be operated completely asynchronously to the primary (random) port. Hence, the primary port can be used to store incoming video information synchronously, as it comes in, while the secondary port can read the video data out of the frame buffer synchronously with the high-resolution graphics display. Thus, a form of time base correction can be achieved by appropriate use of the independent properties of the video RAM's two ports.

DUAL FRAME BUFFER APPROACH

There are several approaches to combining video with high resolution graphics Some methods simply double the scan rate of the incoming video through the use of a line buffer, reading out each video line twice for each line of the high-resolution screen. This method, although it is quite simple to implement, has several major drawbacks. First, it assumes that the high-resolution display is exactly twice the scan rate of the incoming video. This is seldom the case, and always requires a gen-lock circuit at the very least to force this strict relationship between the video and the graphics. It also fails to provide random access to the video information from the host workstation, since there is no frame buffer to store the video information. Another method involves converting the video and graphics information into a common format (e.g. RGB) and storing the two into a single, common frame buffer. While this may at first seem to be an advantage in that only one frame buffer is required, it can be seen that the requirements on this buffer require far more memory than having two separate dedicated buffers. Consider the following: High-resolution graphics has limited color content (typically 8 or less bits/pixel) while having a large number of pixels (typically $640\times480$, $1024\times768$, or higher). On the other hand, video information is rich in color information (16–24 bits/pixel) but only limited resolution ($780\times480$ or less). In order to use a single frame buffer to store both types of visual data, a very large frame buffer is required that is both "wide" and "deep" (e.g. $1024\times768\times24$) Also, by storing both types of information in a common frame buffer, the available update bandwidth has to be shared between the two contending processes.

By using a separate dedicated frame buffer for the incoming video information, a memory organization optimized for the unique characteristics of motion video can be used. In addition, the update of the host computer's high-resolution graphics screen is unimpeded by the process of sampling live video.

DIGITAL TELEVISION APPROACH

The use of a standard off-the-shelf digital TV chip set offers many advantages. These include low cost, ready availability, more accurate control of video parameters, ready acceptance of a wide variety of TV standards for worldwide use, and convenient access for digital communications networks. It is also important to select a chip technology that uses the CCITT 601 recommendation of sampling video with a frequency that is an integer multiple of the incoming video Horizontal Sync period. This feature eliminates the jitter that results when a sub-carrier based system is used in conjunction with a non-standard source, such as a VCR or videodisk.

BRIEF DESCRIPTION OF THE DRAWINGS

FIG. is a block diagram of an audio video interactive display.

DESCRIPTION OF THE PREFERRED EMBODIMENT

The system herein described may have many of the specific characteristics generalized to accommodate future improvements in digital television and personal computer display technologies without departing from the spirit of the invention. In this embodiment, the digital television subsystem is based on a chip set manufactured by Philips. The host system is an IBM Personal System/2 Model 70, which includes a VGA graphics (640×480×4 bit pixel) subsystem. A 12-bit luminance chrominance (Y-C) representation is referred to here, however the concepts described can be generalized to include systems with wider (e.g. 16 or more bits) data paths and higher bandwidths e.g. high definition television (HDTV). In addition, the high-resolution video described need not be limited to the bandwidth and bits/pixel provided by the VGA. Future digital TV and graphics technologies can readily be incorporated without departing from the spirit of this invention.

AUDIO VIDEO DISPLAY CONTROLLER

Figure 1:
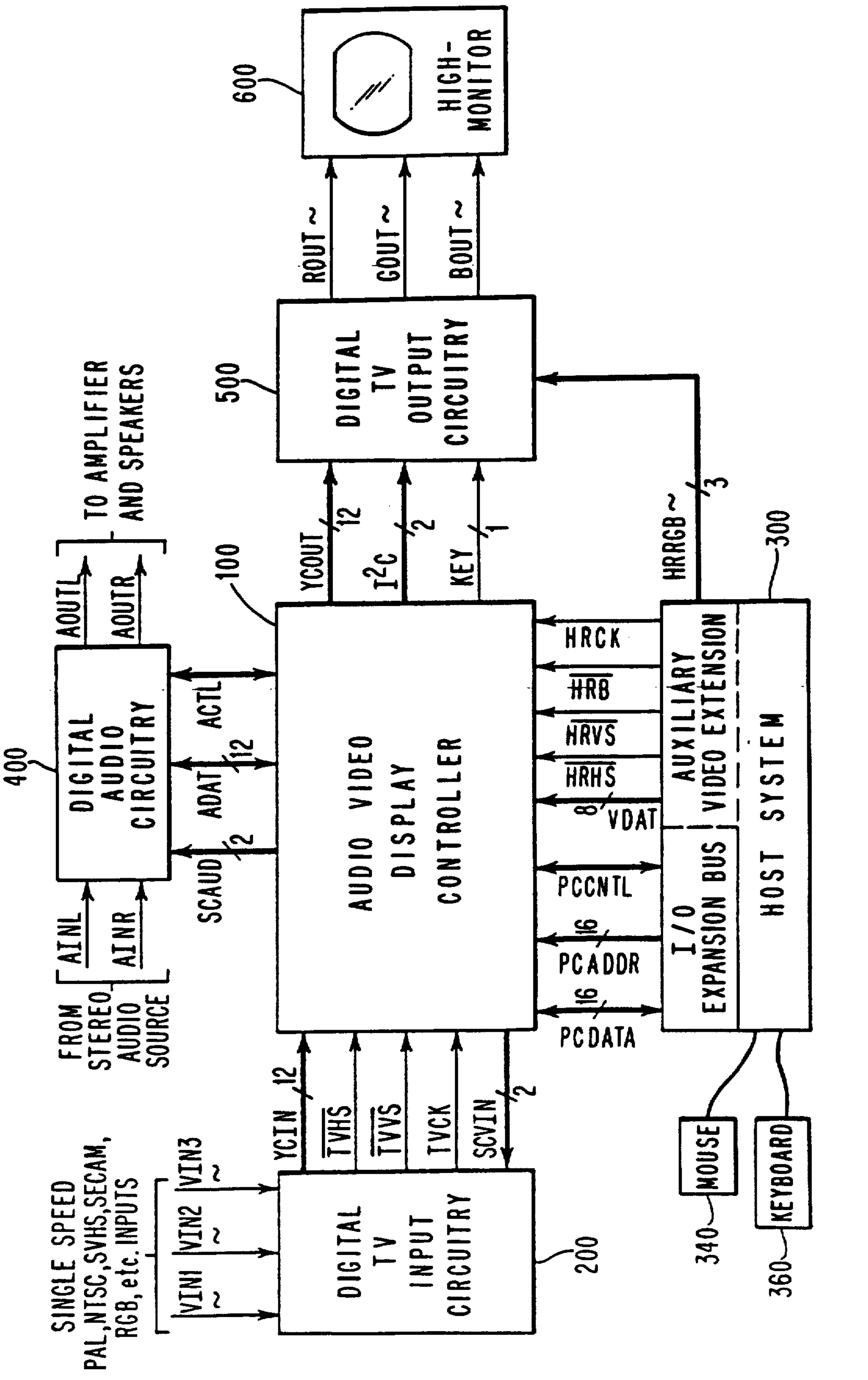

FIG. 1 is a system block diagram showing how a Audio Video Display Controller 100 interfaces to the other components of the system. It takes inputs from digital TV input circuitry 200, a host computer 300, and a digital audio circuitry 400. The host computer may receive input commands from input devices such as a mouse 340 and keyboard 360. The controller 100 provides outputs to the host computer 300, a digital TV output circuitry 500, the digital audio circuitry 400, and a high-resolution monitor 600 via the digital TV output circuitry 500. The digital TV input circuitry 200 and the digital TV output circuitry 500 are of the type set forth in Phillips Corporation's manual 9398 063 30011, date of release 6/88 entitled "Digital Video Signal Processing."

The digital TV input circuitry 200 receives a plurality of analog input signals VIN1, VIN2 and VIN3 which may be, for example a cable TV input, a TV antenna input, a VCR input or the like. It is to be appreciated there may be more or less video inputs from different combinations of TV video sources, such as two or more VCR inputs, two or more cable inputs etc.

The digital TV input circuitry responds to these analog input signals to provide a plurality of digitized TV output signals to the audio video display controller 100. These output signals include a TV clock or sampling clock signal TVCK; horizontal and vertical sync signals TVHS and TVVS, respectively; and a digitized TV data signal YCIN. Control signals are provided to the input circuit 200 from controller 100 on a control bus SVIN1, which may also be known as an $I^2C$ bus.

Figure 3:
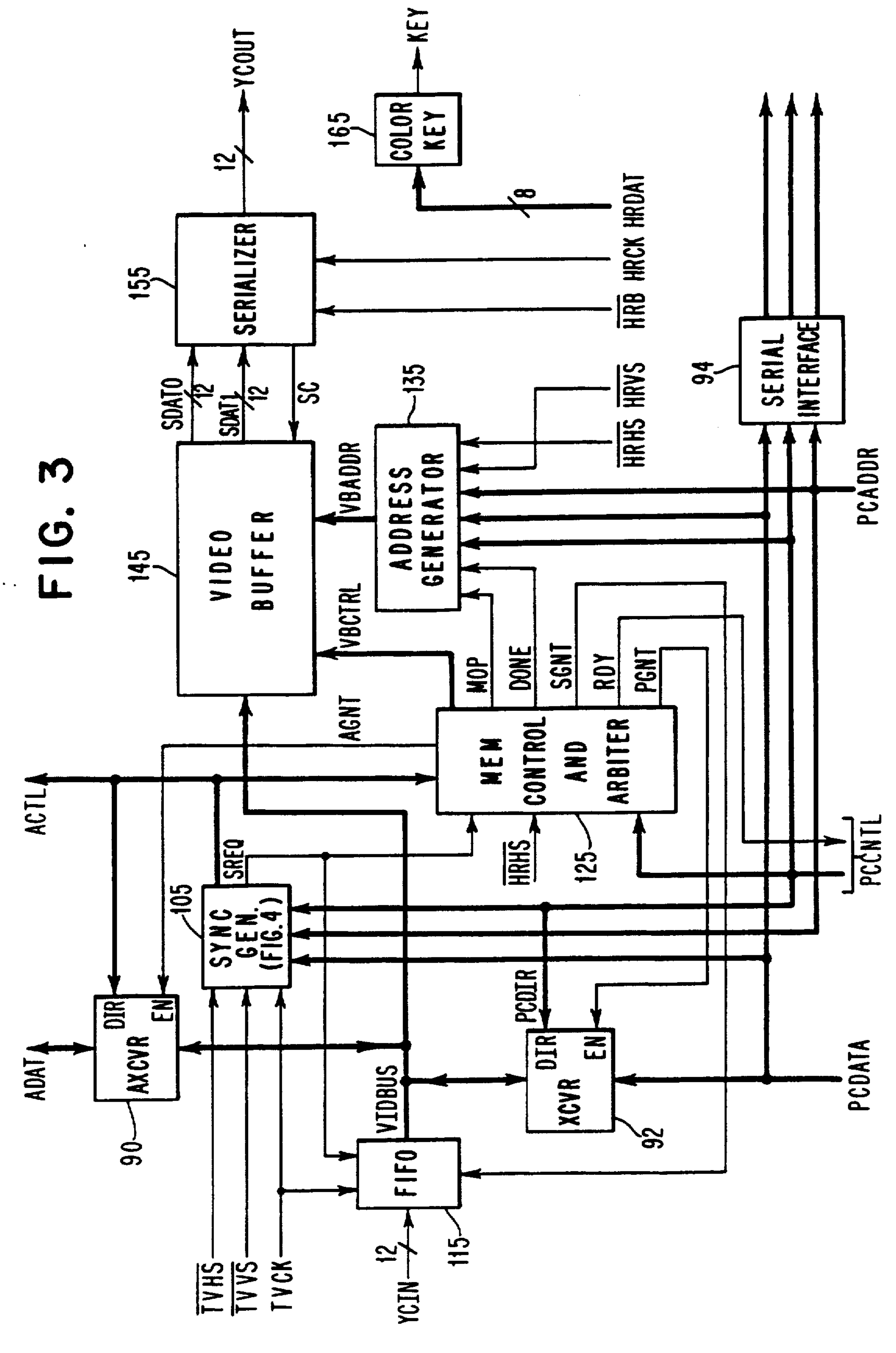
FIG. 3 is a block diagram of the audio video display controller which is shown generally in FIG. 1.

The host computer 300, which for example may be an IBM Personal SYstem/2, the operation of which is described in detail in the IBM Personal System/2 Model 50 and 60 Technical Reference, provides a plurality of signals to the controller 100. These signals include a PC data signal (PCDATA) which may include graphics information for insertion in the on screen portion of a TV frame buffer 145 (FIG. 3), or digitized audio to be stored in an off screen portion of buffer 145 for subsequent play by audio circuit 400, or other data applications; a PC address signal (PCADDR) which indicates where PCDATA is to be stored in the frame buffer 145 (FIG. 3); PC control signals (PCCNTL); video data for high resolution display (VDAT); high resolution horizontal and vertical sync signals, (HRHS) and (HRVS), respectively; a high resolution blanking signal (HRB); a high resolution clock signal (HRCK); and high resolution red, green and blue signals, (HRRGB) from a high-resolution buffer in the host 300 is provided to the digital TV output circuitry 500.

The Digital Audio Circuitry 400 receives a plurality of audio inputs such as audio in left (AINL) and audio in right (AINR) from audio sources such as microphones, CD players, stereo audio sources and the like. Audio output signals, audio out left (AOUTIL and audio out right (AOUTR) are provided to amplifiers and speakers (not shown). The control of the digital audio circuitry is provided by a plurality of signals from the audio video display controller 100. These signals include a sampling clock signal for audio (SCAUD); an audio control or sync signal (ACTL); and an audio data signal ADAT.

The audio video display controller 100 responds to the respective signals from input circuitry 200, host 300 and audio circuitry 400 to provide a plurality of signals to the digital TV output circuity 500. These signals include control signals on bus $I^2C$; a TV video image out (YCOUT); and a video color switch signal (KEY) which selects between the TV image YCOUT and the high resolution image HRRGB from the host for display on the high resolution monitor 600. Red, green and blue output signals ROUT, GOUT and BOUT, respectively are applied to the monitor 600 from TV output circuitry 500.

Figure 2:
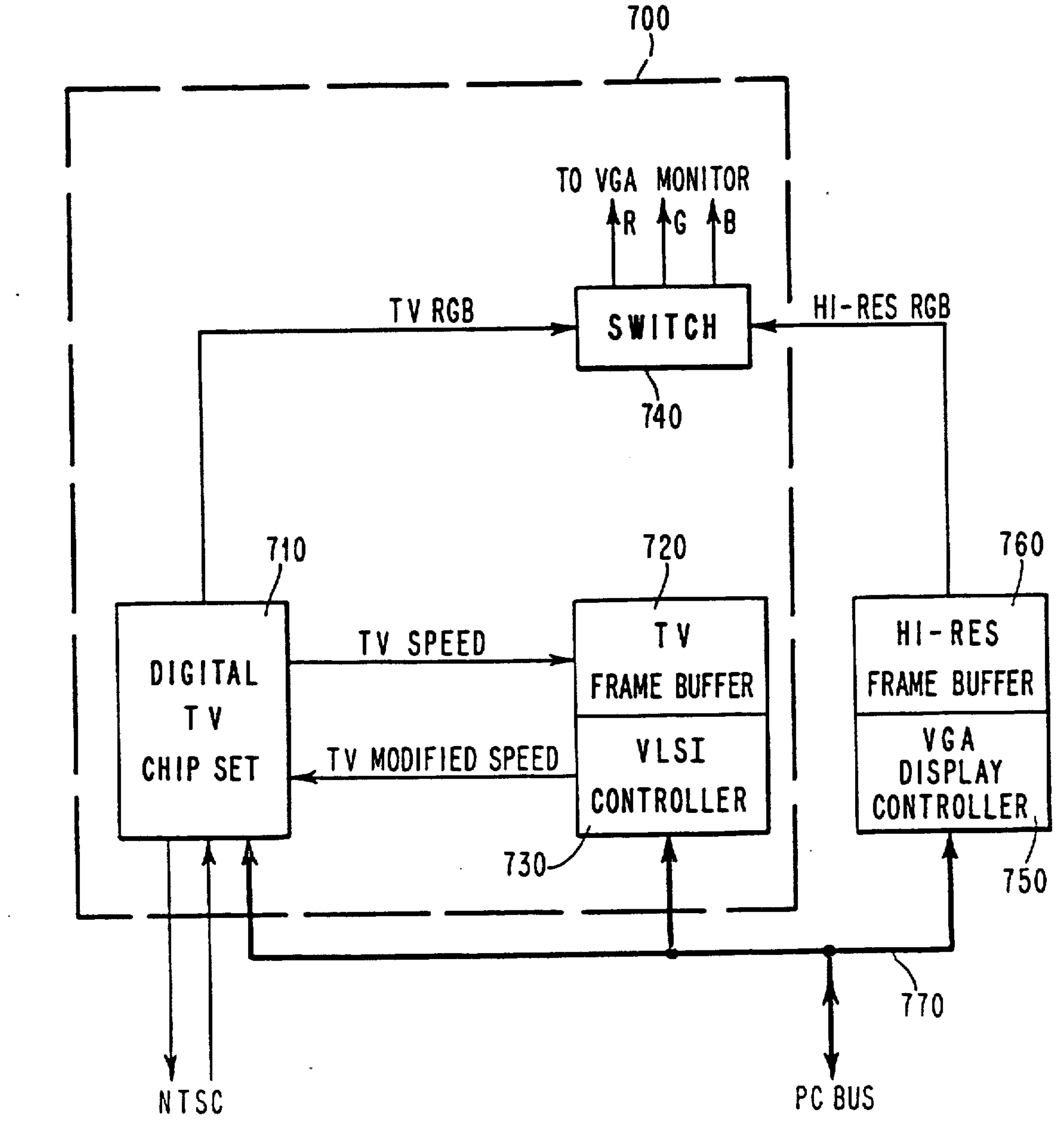
FIG. 2 is a block diagram illustrating the dual buffer concept.

Refer now the FIG. 2 which illustrates in general the dual frame buffer concept of the invention. A more detailed description is set forth in the remaining figures. As previously stated, relative to FIG. 1, the digital TV output circuitry 500 selects between a standard digital TV video signal from a buffer in the audio video display controller 100 and a high resolution graphics video signal from a buffer in the host computer 300. In FIG. 2, a logic block 700 includes a digital TV chip set 710, which is a composite of digital TV input and output circuitry 200 and 500, respectively of FIG. 1; a TV frame buffer 720 and VLSI controller 730 which are included in the audio video display controller 100 of FIG. 1; and a switch 740 which is included in the digital TV output circuitry 500 of FIG. 1. A Video Graphics Adaptor (VGA) display controller 750 and a high resolution frame buffer 760 are connected to a PC bus 770 and are included in the host computer 300 of FIG. 1. The PC bus is also connected to the digital TV chip set 710 and controller 730. The controller 730 receives PCDATA, PCADDR and PCCNTL on the PC bus. The PC data may be host computer graphics data which is stored in an on screen portion of buffer 720; or PC digital audio data which is stored in an off screen portion of buffer 720. This is described in detail relative to FIGS. 3 and 10.

In practice, an NTSC TV video signal is provided to chip set 710 and is converted to a digitized TV speed signal which is written to the TV frame buffer 720 under control of controller 730. A TV modified speed video signal is read from the buffer 720, also under control of controller 730 to chip set 710. The read and write operations are asynchronous with respect to each other. A TV RGB signal is then provided from chip set 710 as a first input to switch 740. This first input is from the TV Frame buffer. High resolution video information such as graphics video information is provided on PC Buss 770 to VGA display controller 750, which in turn provides high resolution pixel data to frame buffer 760. Buffer 760 provides a high resolution graphics RGB signal to a second input of switch 740. Switch 740 under control of control signals from computer 300 selects which of the dual buffers 720 and 760 provides a RGB video signal to the high resolution VGA monitor at a given time. At any given time, the following is viewed on the VGA monitor:

(1) An all TV image from buffer 720.

(2) An all graphics image from buffer 760.

(3) A TV image from buffer 720 with at least one window of graphic images from buffer 760.

(4) A graphics image from buffer 760 with at least one window of TV images from buffer 720.

A detailed description of the respective image generations and selection process is set forth in detail below.

FIG. 3 is a detailed block diagram, showing the various components of the display controller 100. The display controller 100 includes transceivers 90 and 92, a serial interface 94, a sync generator 105; FIFO logic 115; memory controller and arbiter 125; address generator 135; video buffer 145; serializer 155; and color key 165.

The general operation of audio video display controller 100 is as follows. A sync generator 105 receives the TV clock signal (TVCK), TV horizontal sync signal (TVHS) and the TV vertical sync signal (TVVS) and in response thereto generates an audio control signal (ACTL) which is sent to the digital audio circuitry 400 and memory control and arbiter 125 to indicate when control of audio operations is to take place. A SREQ signal output is utilized by the memory control and arbiter 125 for windowing operations.

A FIFO 115 buffers incoming TV video data YCIN under control of TVCK and SGNT from memory control and arbiter 125. Video out from the FIFO 115 is provided to the video bus (VIDBUS) when SGNT is high. The VIDBUS also receives data from transceiver AXCVR 90 and transceiver XCVR 92. AXCVR 90 transmits to, and receives digital data (ADAT) from digital audio circuit 400. XCVR 92 receives PC data from host 300. This PC data may comprise graphics video in the on screen portion of video buffer 145, or digital audio for storage in the off screen portion of video buffer 145. Memory control and arbiter 125 controls which of FIFO 115, AXCVR 90 and XCVR 92 is providing data to the VIDBUS at a given time, based on the state of SGNT or AGNT or PGNT, respectively. When the PC data is audio data that is stored in the off screen portion of video buffer 145, this audio data may then be subsequently read out and provided to AXVR 90 and transmitted to digital audio circuit 400 for subsequent replay.

The memory controller and arbiter 125 arbitrates for various requests for memory cycles under control of PC control signals (PCCNTL) from host 300. Besides the control signals utilized for FIFO 115, AXCVR 90 and XCVR92, as discussed above, control signals are also provided to address generator 135 and video buffer 145. Buffer 145 receives a video control signal (VBCTRL) and address generator 135 receives a MOP and DONE signals, which are described shortly.

Address generator 135 receives PC addresses (PCADDR) from host 300 which are indicative of where PC data is to be stored. Addresses (VBAADDR) are provided to the video buffer 145 to indicate where data on the VIBUS is to be stored.

The PCADDR is also applied to a serial interface 94 which connects to the $I^2C$ bus, providing SCVIN to digital input circuitry 200; SCVOUT to digital output circuitry 400, and SCAUD to digital audio circuitry 400.

Serializer 155 takes the video data out from video buffer 145 and provides it to digital TV output circuitry 500. Color key 165 provides a KEY signal to digital TV output circuitry 145 for determining which video is displayed on high resolution display 600 at a given time The main components of audio video display controller 100 are described in detail below.

SYNC GENERATOR 105

Figure 4:
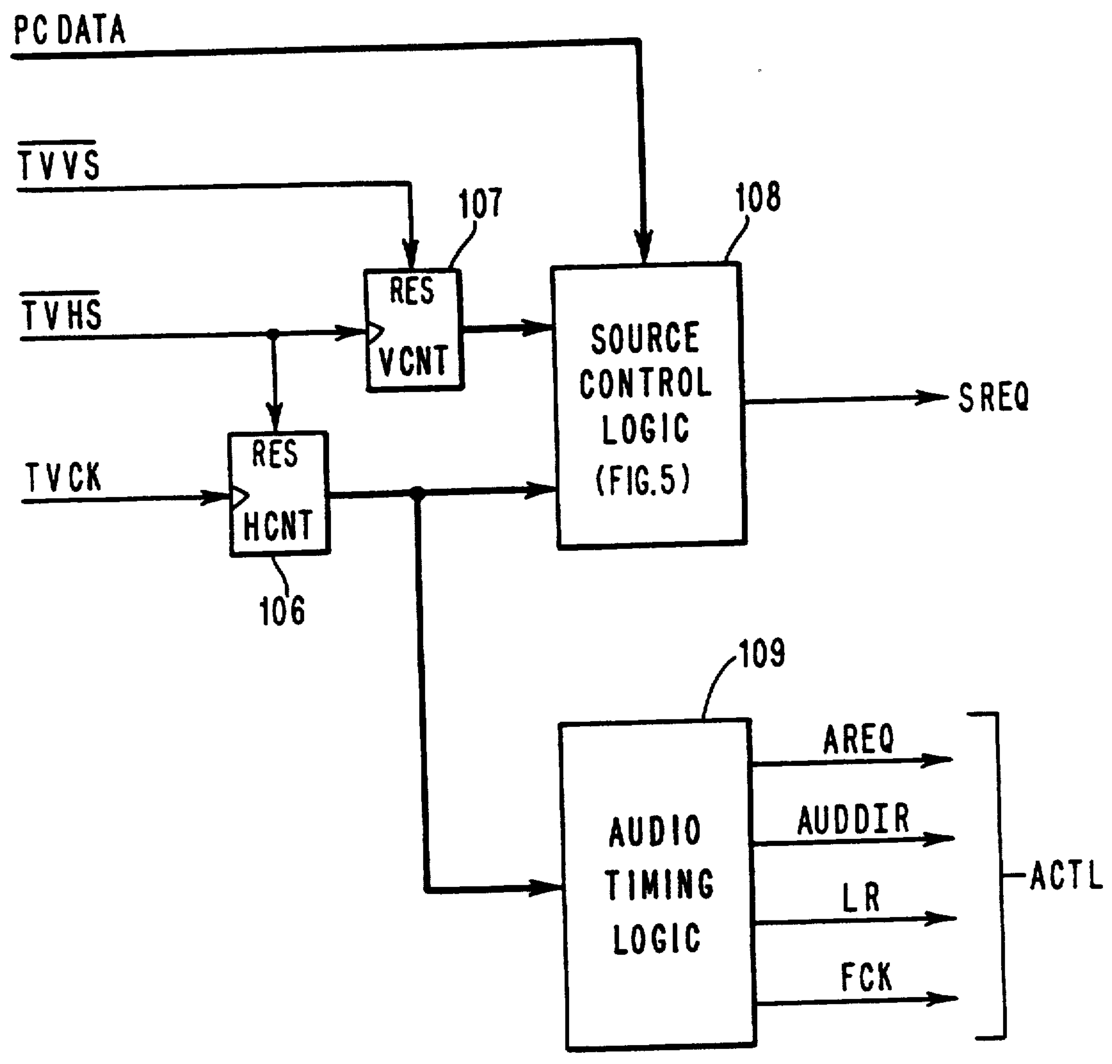
FIG. 4 is a block diagram of the sync generator which is shown generally in FIG. 3.
Figure 6:
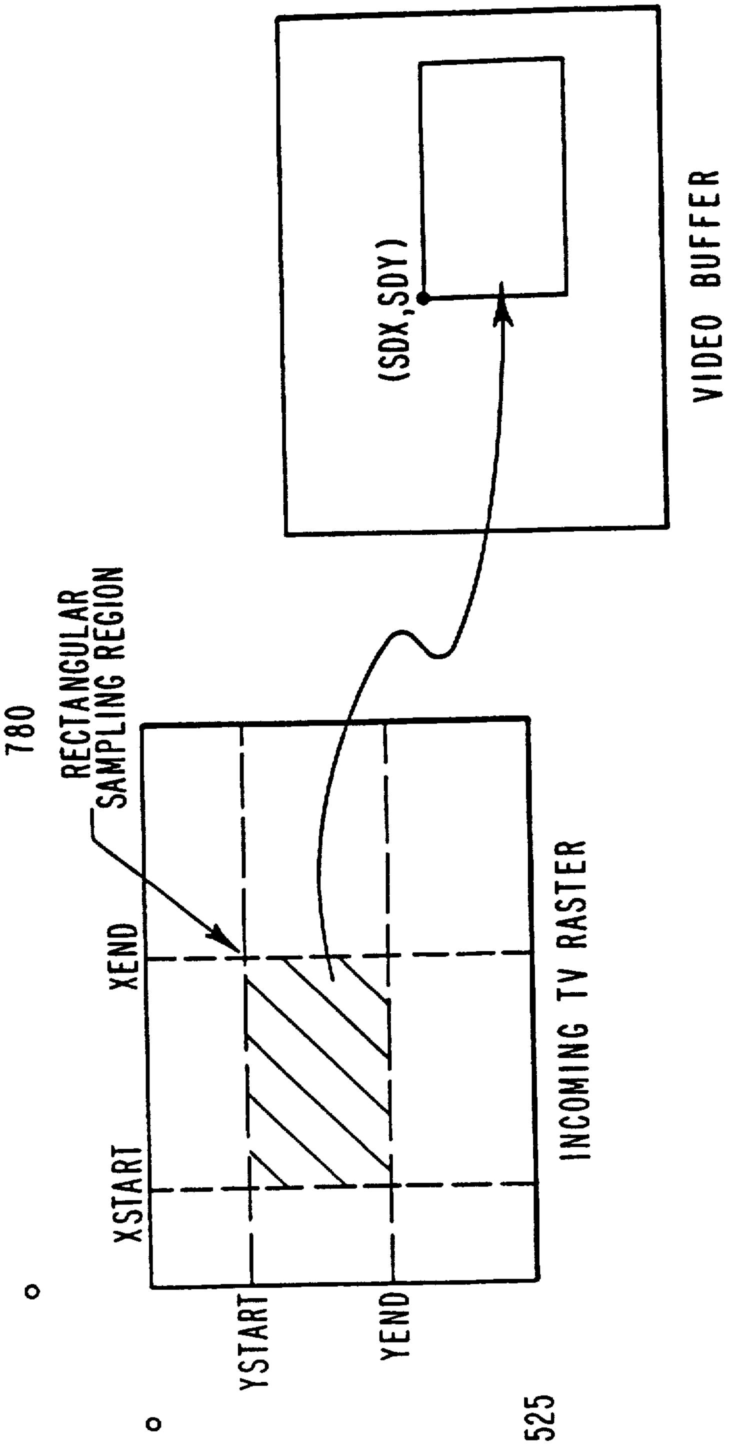
FIG. 6 is a diagram illustrating sampling region parameters and sampling destination addresses.

The main purpose of the Sync Generator circuit 105, as shown in FIG. 4, is to generate requests to the memory controller for a video sampling cycle whenever the incoming TV raster is within a user-specified region. All information inside this region is written into the video buffer 145, while all information outside of this region is ignored. FIG. 6 illustrates how the "video sampling region" is defined. There are four parameters written to the Sync Generator 105 by the host computer 300. These are: XStart, XEnd, YStart, and YEnd Referring to FIG. 4, it is seen that two counters are employed to keep track of where in the TV raster the incoming video is from. For each incoming video "pixel" a horizontal counter (HCNT) 106 is incremented by the clock signal TVCK, which has the same frequency as the incoming digital video data. In this embodiment, this frequency is 13.5 MHz or 910 times the period of TVHS-. At the end of a scanline, this counter is reset (by TVHS-). In a similar manner, a vertical counter (VCNT) 107 is incremented by TVHS- one time for every scanline of incoming video It is reset at the end of a field by the TVVS- signal. A source control logic receiver has as inputs, PCDATA, and the outputs from counters 106 and 107. An audio timing logic 109 has a single input from counter 106.

Figure 5:
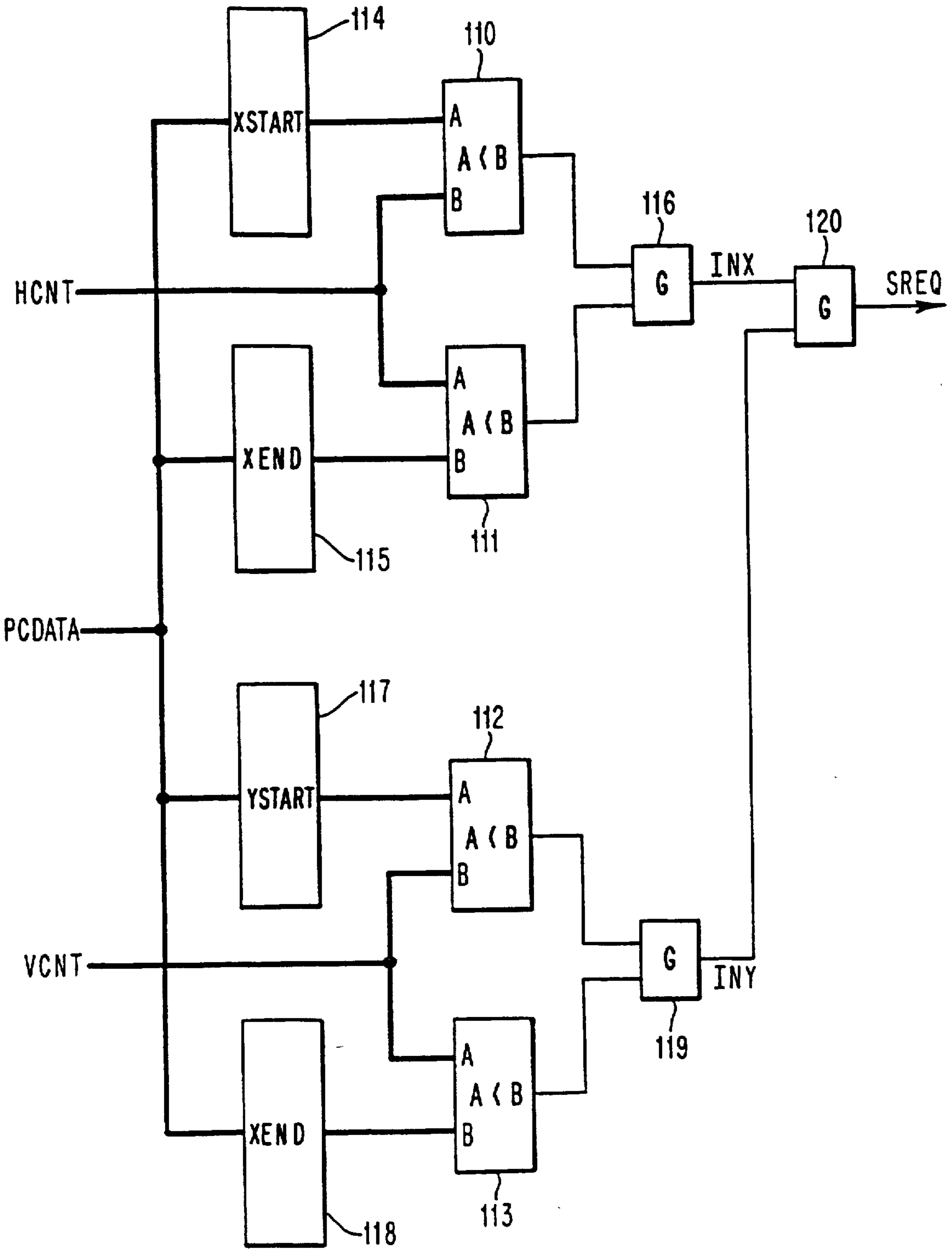
FIG. 5 is a block diagram of the source control logic which is shown generally in FIG. 4.

The source control logic 108 is shown in FIG. 5, and is comprised of two pairs of comparators, one pair 110 and 111 for horizontal comparison, one pair 112 and 113 for vertical comparison. When the X-coordinate of the incoming raster falls between XSTART 114 and XEND 115, the signal INX from gate 116 is asserted. Similarly, when the Y- coordinate of the incoming raster falls between YSTART 117 and YEND 118, the signal INY from gate 119 is asserted. When both signals are true, the raster is within the rectangular region depicted in FIG. 6, and the Sync Generator 105 generates a Sample Request (SREQ) from gate 120 to the memory controller and arbiter 135.

An additional function of the Sync Generator 105 is to generate the appropriate timing signals to control the digital audio circuit by the audio timing logic 109 (FIG. 4). The timing is generated based on the video clock, TVCK which controls counter 106, the output of which controls logic 109. The audio sample rate is based on an integer divisor of TVCK. For the system shown, the rate is approximately 64 KHz. Every audio sample is initiated by the assertion of an Audio Request (AREQ) signal at a first output of logic 109. An LR signal at a second output of logic 109 toggles back and forth on every other audio request, causing the left and right audio channels to be digitized or played back on alternate audio cycles. This yields an effective sampling rate of 32 KHz per channel in this embodiment. An AUDDIR signal at a third output of logic 109 is a control register bit that determines the type of audio cycle being requested. If AUDDIR is 0, an audio record (digitize) cycle is performed. If AUDDIR is 1, an audio playback cycle is performed. This signal is used directly to control the direction of the Audio Transceiver (AXCVR).

A Filter Clock signal (FCK) at a fourth output of logic 109 is used to clock the pre- and post-filters at the appropriate rate. This frequency directly determines the cut-off frequency of these low-pass filters. For a sample rate of 32 KHz the cutoff frequency should be no more than 16 KHz according to the Nyguist Theorem. If a lower sampling rate is required, for example to handle speech-quality audio, or to reduce host storage requirements, the frequency of FCK would have to be lowered correspondingly.

FIFO LOGIC 115

Figure 7:
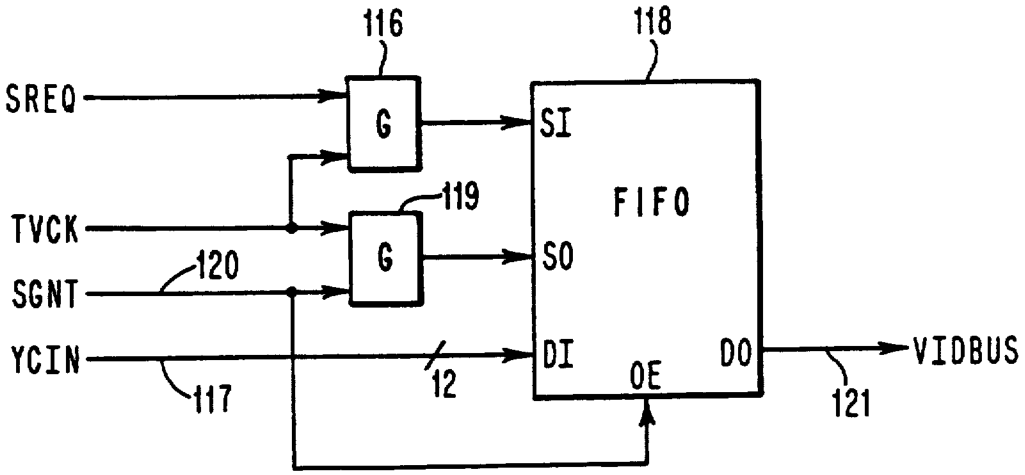
FIG. 7 is a block diagram of the FIFO shown generally in FIG. 3.

The FIFO 115 shown in FIG. 7 is used to buffer the continuous stream of incoming video data while the memory controller is busy handling other requests, such as memory refresh. Whenever sampling is taking place, as indicated by SREQ being asserted at gate 116, video data on line 117 is shifted into the FIFO at the rate of one video sample per TV Clock (TVCK) at gate 119. As long as the memory controller is actually performing Sample cycles (indicated by the fact that Sampling Grant on line 120, or SGNT, is asserted), video data can be shifted out of the other end of the FIFO on line 121, also at the TVCK rate.

If however the memory controller is busy performing another cycle, SGNT on line 120 is not active, and no data is clocked out of the FIFO. Any samples that arrive during this time, accumulate in the FIFO. The FIFO only drives data onto the Video Bus (VIDBUS) 121 when it has been granted access to the bus (when SGNT=1) by the Memory Controller/Arbiter.

MEMORY CONTROLLER AND ARBITER 125

Figure 8:
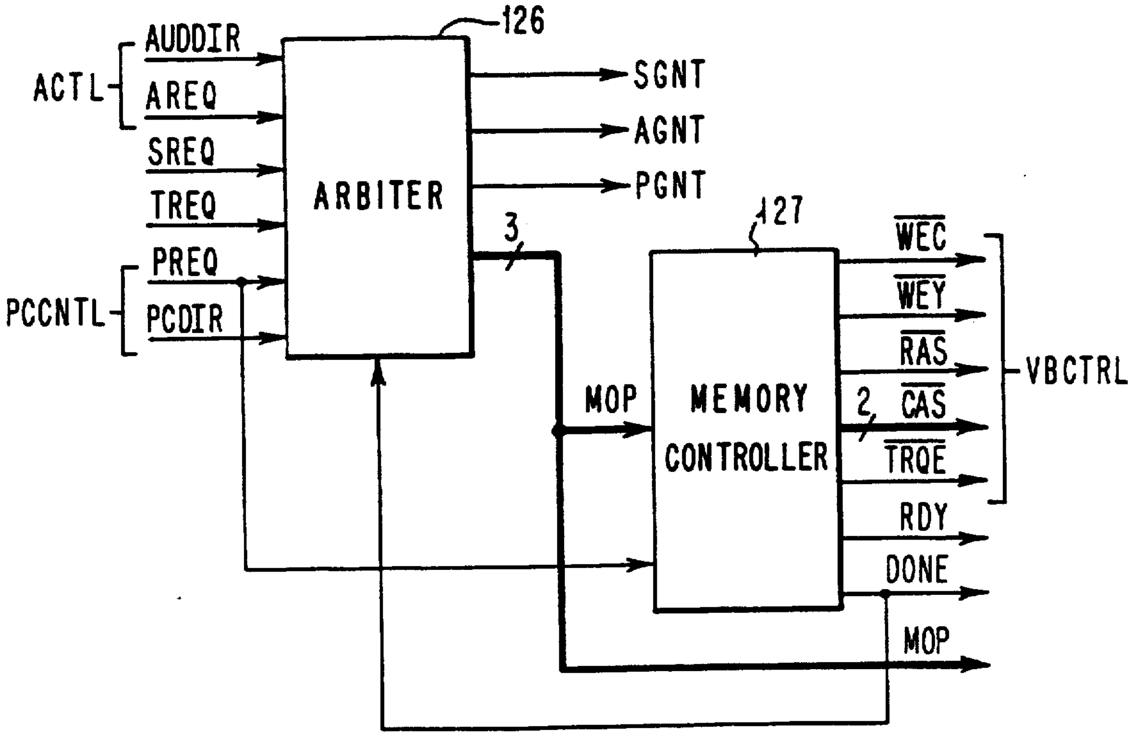
FIG. 8 is a block diagram of the memory controller and arbiter shown generally in FIG. 3.

This circuit, illustrated in FIG. 8, is responsible for arbitrating between the various requests for memory cycles, and then carrying out the cycle by generating the appropriate control signals to the video buffer 145. It also signals to the other components in the system which memory cycle it is currently performing, as well as providing an indication that the current cycle is complete. It controls access to the shared Video Data base (VIDBUS) via a request/grant protocol. Although multiple devices are attached to the Video Bus, this scheme assures that only one device at a time is allowed to drive data onto it. Finally, it can delay the host computer's I/O cycle long enough to insure that the host's data has been safely written to or read from the Video Buffer.

There are four possible requests that come to the memory controller and arbiter 125, and are applied to the arbiter logic 126. These are: Audio Request AREQ), Sample Request (SREQ), Transfer Request (TREQ), and PC Request (PREQ). There are two additional signals that specify the direction of the Audio and PC cycles requested. These are AUDDIR and PCDIR, respectively. In these two cases, the sequence of control signals generated depends on the whether the memory cycle is a read or a write. Each of the requests has a predefined priority in the arbitration scheme. In decreasing priority, they are:

1. TREQ
2. AREQ
3. SREQ
4. PREQ

The arbiter 126 provides input to a memory controller section 127. When the current memory cycle is completed, a DONE signal is asserted at the output of controller 127, indicating this fact. At this time, the currently asserted request with the highest priority is serviced. If the serviced request requires use of the common Video Bus, the requesting device is given control of the bus via an appropriate Grant signal. The grant signals are Audio Grant (AGNT), PC Grant (PGNT), and Sample Grant (SGNT) provided at respective outputs of arbiter 126. Note that the PGNT signal is used to enable the PC data bus transceiver (PXCVR), while the direction of this transceiver is controlled by the PCDIR signal.

Once arbitration is completed, the memory cycle appropriate to the winning request is performed. A memory operation code (MOP) is produced, indicating the type of memory cycle currently being performed.

The specific sequence of control signals for the Video Buffer 145 depends on the particular VRAM devices used to construct it. The control signals are typical of all DRAM devices, with the exception of the TR/QE- signal, which is typical of VRAMs only. Note that there are two separate Write Enable signals (WEY- and WEC-) at the output of controller 27. This allows separate write access to the Luminance (Y) and Chrominance (C) information in the Video Buffer 145. For example, to write a monochromatic image of the incoming video, the Video Buffer could first be cleared, and then only the Luminance information would be sampled, keeping the Chrominance Write Enable signal (WEC-) inactive (high) throughout.

Figure 16:
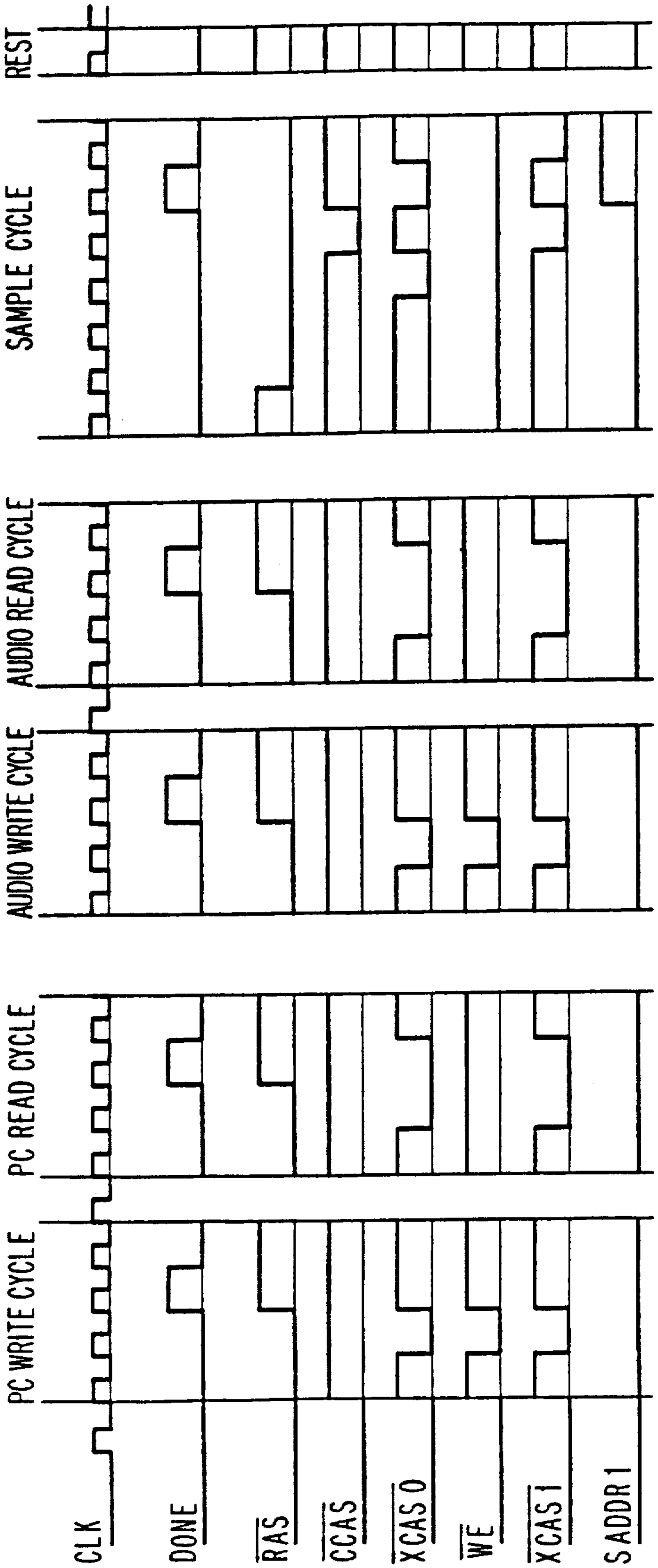
FIG. 16 and 17 are timing diagrams which are useful in the understanding of the invention.
Figure 17:
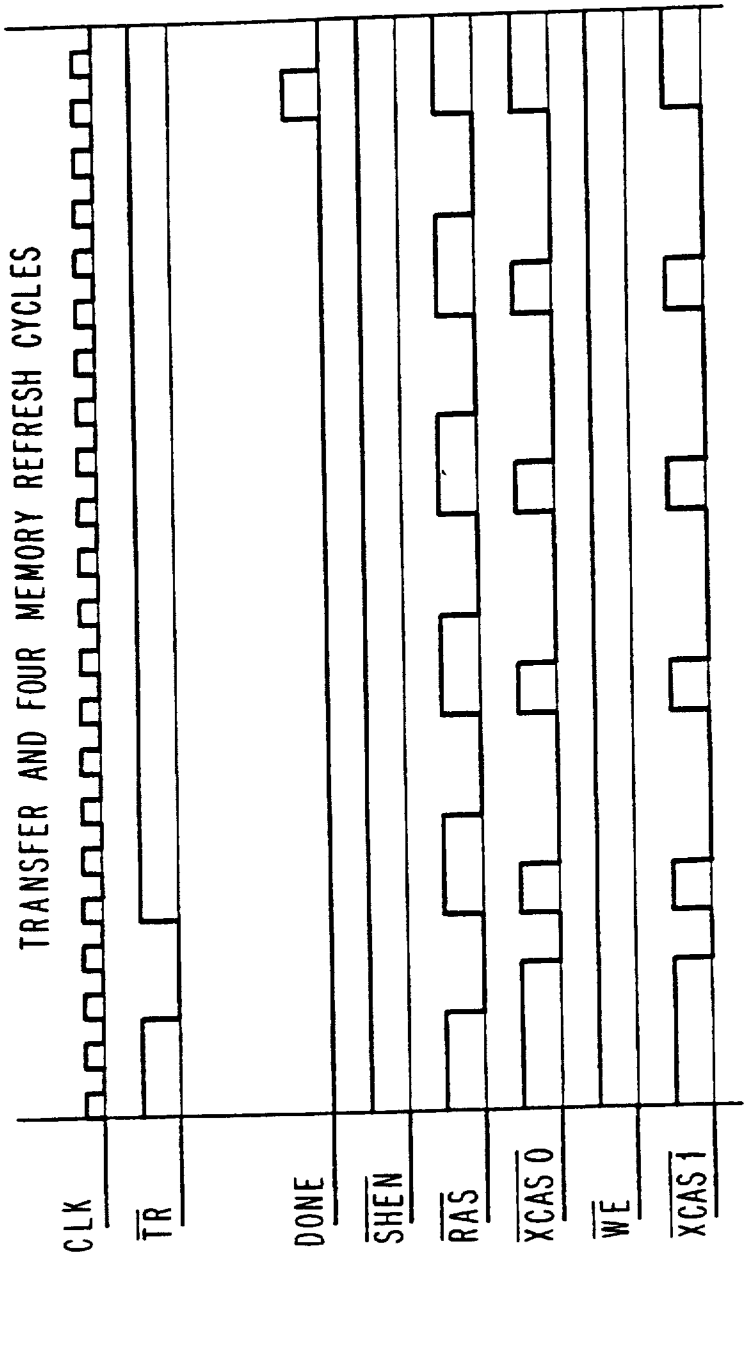

A typical set of timing diagrams is shown in FIGS. 16 and 17. These control sequences are generated using a generic sequences design, which progresses through multiple states until a given sequence (memory cycle) is completed. At this time the DONE signal from controller 127 is asserted, indicating to the other subsystems that the current cycle is completed.

When the host computer requests a memory cycle (via PREQ to arbiter 126), the RDY signal from controller 127 is immediately brought inactive (low) in order to extend the host's bus cycle long enough to transfer the data to the video buffer 145. When the data transfer is complete, the RDY signal is released, allowing the host computer 300 to complete the bus cycle.

ADDRESS GENERATOR 135

Figure 9:
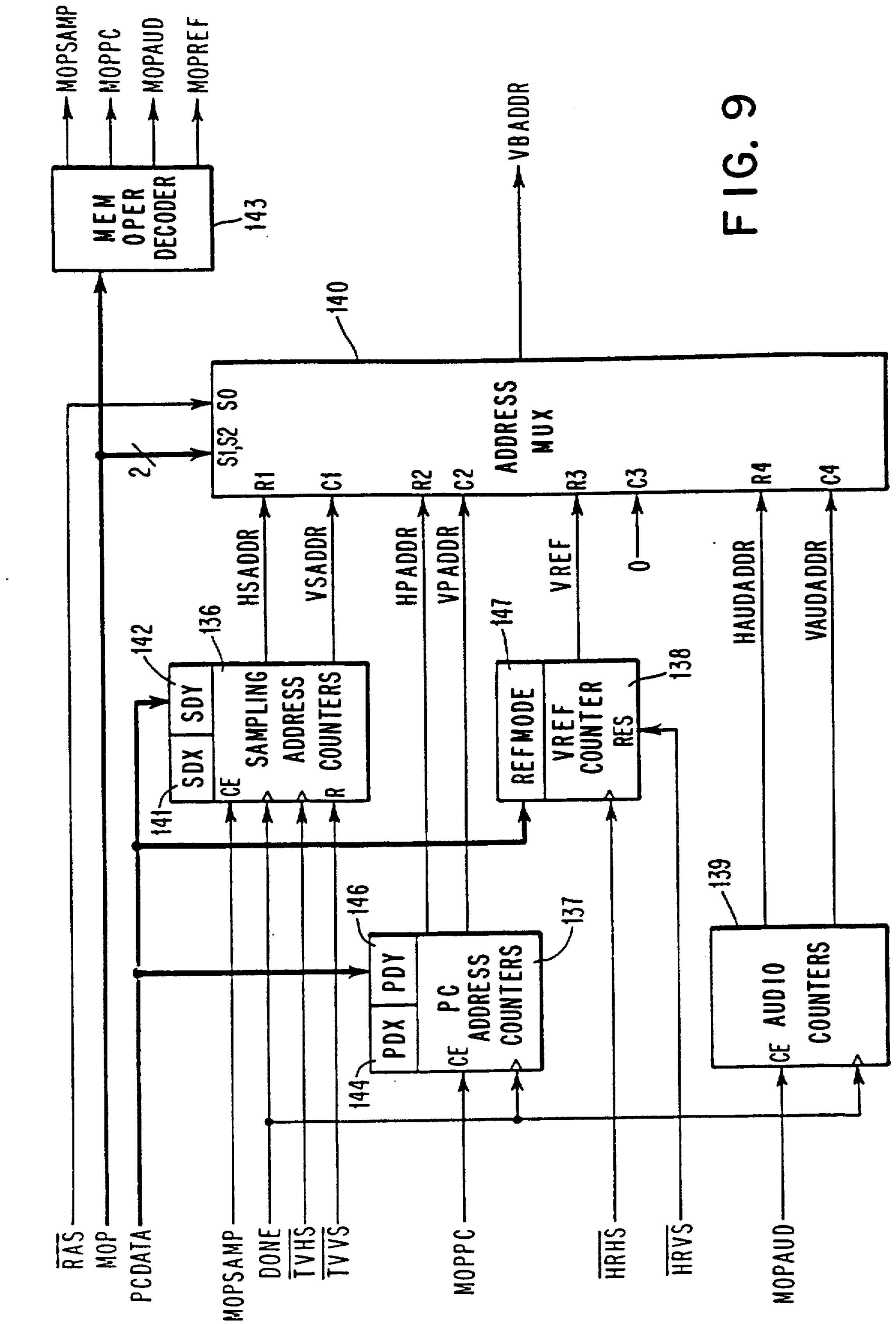
FIG. 9 is a block diagram of the address generator shown generally in FIG. 3.

The Address Generator circuit 135 shown in FIG. 9 provides all addresses for the various Video Buffer memory cycles outlined above. It includes separate, dedicated counters for Sampling 136, Host (PC) 137, Display Refresh 138, and Audio addressing 139. As various cycles repeatedly take place, this circuit automatically updates the counters so that the appropriate region of the Video Buffer is accessed. There is a large multiplexor 140 which selects the counter output appropriate for the current operation and correctly divides the address into row and column components for successive output to the Video Buffer during RAS- and CAS- respectively.

The Sample Address Counters 136 generate a sequence of addresses that fill a rectangular region of the Video Buffer 145 corresponding in size with the input region selected by the Sync Generator 105. The upper left corner of this region is stored in two registers: Sampling Destination X-address (SDX) 141 and Sampling Destination Y-address (SDY) 142. These registers are set by the host computer using the PCDATA bus. Refer to FIG. 6. As each sampling memory cycle completes (as indicated by decoding the Memory Operation (MOP) to MOPSAMP via the Memory Operation Decoder 143, and finding DONE asserted), the Horizontal Sampling Address (HSADDR) increments across a scanline. At the end of each scanline, as signalled by TVHS-, the Vertical Sampling Address (VSADDR) is incremented by 1, and HSADDR is reset to its initial value (SDX). At the end of a field, as signalled by TVVS-, VSADDR is reset to its initial value (SDY).

The Host (PC) Address counters 137 operate in a manner very similar to the Sample Address counters 136. As each host memory cycle completes (as indicated by decoding MOP=MOPPC and DONE asserted), the Horizontal PC Address (HPADDR) increments. After a full line of video has been read from (or written to) the video buffer 145 by the host 300, the Vertical PC Address (VPADDR) increments, and HPADDR is reset to its initial value. The upper left corner of the region accessed by the host is determined by the PC Destination X-address (PDX) register 144 and PC Destination Y-address (PDY) register 146, both of which can be set via the host data bus (PCDATA). This auto-increment scheme allows the host computer to fill a rectangular region of the Video Buffer 145 with a single stream-oriented instruction, such as the OUTSW or INSW instruction of the Intel 80×86 processors.

The Video Refresh Counter (VREF) 138 is used to determine which scanline of video memory is to be transferred to VRAM serial port on the next Video Refresh (TR/QE-) cycle. During each Horizontal Sync interval of the host's high resolution display (HRHS-), one scanline of VRAM must be transferred, so that the contents of the appropriate scanline in the Video Buffer 145 can be shifted out synchronously with the high-resolution display 600. The particular sequence of Video Buffer scanlines transferred can be controlled by the host 300 using the Refresh Mode Register (REFMODE) 147. Normally, the lines are transferred progressively, with the Video Refresh Address (VREF) incrementing by one after each scanline is transferred. This is known as progressive scan mode. This mode provides the highest effective vertical resolution, but exhibits some "scalloping" artifacts if the subject moves horizontally from one field to the next. The subject is seen in one position on the even scanlines, and in another on the odd ones in between The effect is most noticeable in distinct vertical edges with substantial horizontal motion.

For this reason, another mode, called double-scan mode, is provided. Here, each Video Refresh Address is used twice in succession, resulting in each of the incoming scanlines in the first (even) TV field being shown twice in the first high-speed output frame. During the next (odd) TV field, the Video Refresh address are again used twice each, causing the scanlines in the next-speed output frame to again be doubled. This mode has slightly lower vertical resolution than the progressive mode, but is more appropriate for images that exhibit artifacts using that mode. Since the scanlines are doubled, each high-speed output frame only contains information from one incoming TV field, so no scalloping occurs.

The Horizontal and Vertical Audio Addresses (HAUDADDR and VAUDADDR) are produced by the auto incrementing Audio Counters 139 when PCDATA from host 300 is audio data. They produce a sequence of addresses corresponding to an off-screen region portion of Video Buffer 145. After each audio memory cycle completes (as indicated by MOPAUD and DONE asserted), the counters increment, so that the next audio data from host 300 is sorted in contiguous locations in the Video Buffer 145.

The Address Multiplexor 140 performs two functions in parallel. First, it selects the appropriate address "type" from among the counters, Sampling 36, Host (PC) 137, Video Refresh 138, and Audio 39. Second, each of these address types must be split into it's row and column components before being driven to the VRAM array. So there are actually 8 possible inputs to the MUX 140, divided into 4 pairs. The appropriate pair is determined by examining the two high order bits of the MOP (the LSB of MOP is only used to indicate direction). The Row Address component must drive the Video Buffer Address while RAS- falls, in order to be strobed into the VRAM's Row Address latches. Once RAS- has fallen, the Column Address component of a pair is selected. Note that the Column Address component of the Video Refresh Address is always exactly 0. This is because it is necessary to start shifting video samples out of the Video Buffer starting with the leftmost sample (Column 0).

VIDEO BUFFER 145

Figure 10:
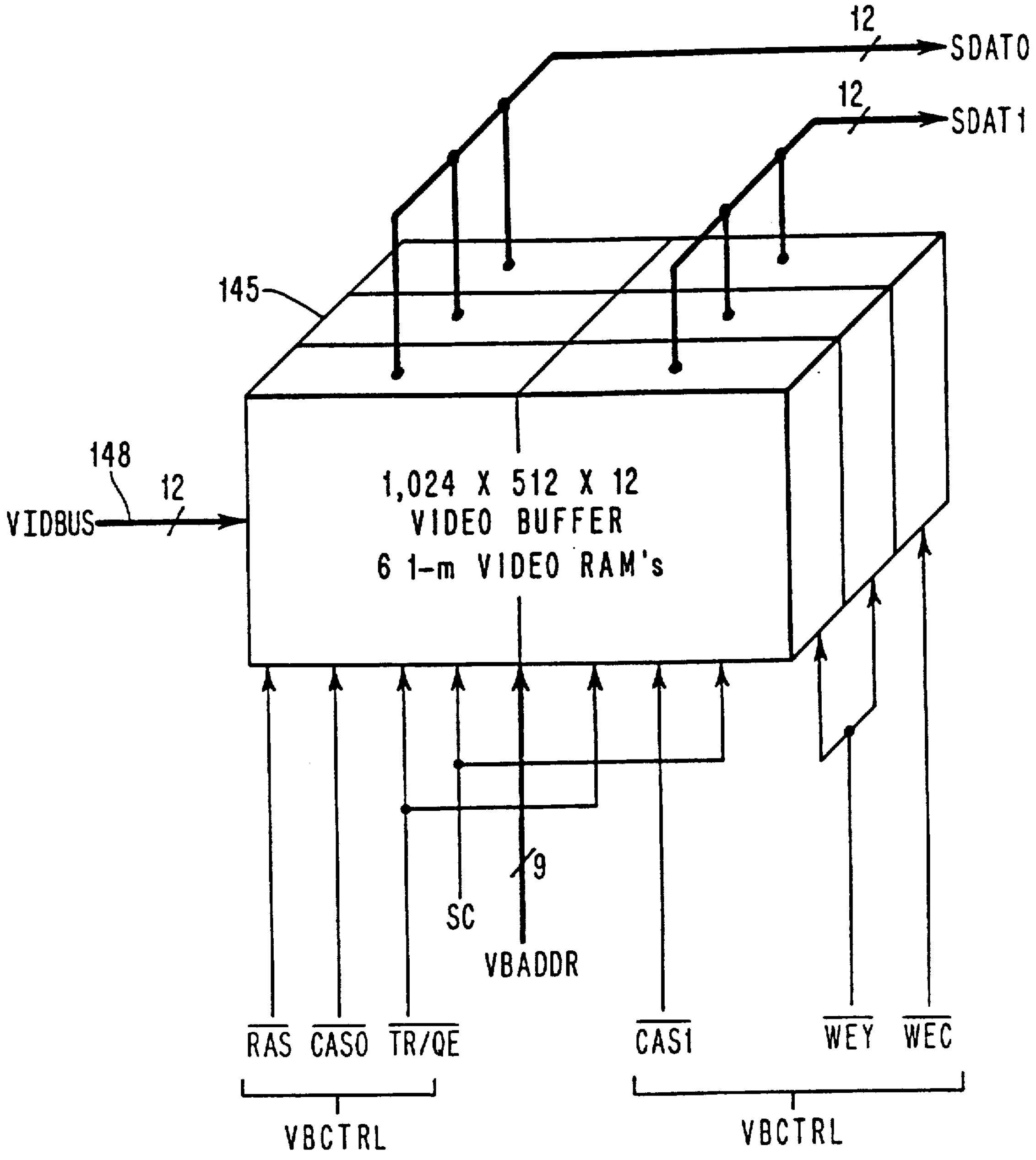
FIG. 10 is a block diagram of the video buffer shown generally in FIG. 3.

The Video Buffer 145 shown in FIG. 10 is an array of Video Memories including an on screen portion and an off screen portion. The on screen portion is used to store the live TV video image data as it comes in, and to store PC DATA when it is graphics data. In this particular embodiment, the organization is 1,024 video samples across by 512 scanlines high by 12 bits deep, being comprised of 61 Megabit (512×512×4 bit) devices. These numbers were chosen to accommodate the specific resolution and depth characteristics of the digital TV chip set used.

For future digital TV systems having either higher resolution or deeper samples, it is simple to change the size of the video buffer to accommodate the new system's characteristics. The off screen portion is used to store PC DATA when it is audio data. It is to be appreciated that two separate memories could be utilized in the practice of the invention, that is a first memory to store TV video data and graphics data from the host 300; and a second memory to store audio data from the host 300.

The incoming data bus (VIDBUS) 148 carries all information to and from the primary port of the VRAM array. This includes incoming TV video data to be sampled, digital audio data (in PC DATA and out), and host computer graphics data (PC DATA in and out). The particular access being performed is determined via standard control signals RAS-, CASO-, TR/QE, WEY- by the memory controller 125 described above. The address at which a given cycle takes place is determined by VBADDR, which is provided by the Address Generator circuit 135, also described above. As set forth above, TV video data and host computer graphics data are stored in the on screen portion; and host audio data is stored in the off screen portion of video buffer 145.

Note that there are left and right halves of the Video buffer. Each half has a unique CAS-Line, which allows a 2:1 interleaved access to the Frame Buffer. This effectively halves the cycle time required to transfer data into the Buffer. This is critical, since the incoming video samples are being clocked out of the FIFO 115 at the TVCK rate, or approximately every 70 nsec in this system. The fastest page mode cycle that can be performed using today's VRAM technology is around 90nsec. By using 2:1 interleave, effective page mode access times as fast as 45nsec are achieved, which is sufficient for current motion video data rates. For significantly higher data rates, higher interleave ratios and deeper Video Buffer organizations are required.

There are separate Write Enable signals for Luminance and Chrominance, for reasons mentioned above under the Memory Controller 125 description.

There are two separate 12-bit serial data busses shown here, one for each of the left and right halves. Every time the VRAM serial ports are shifted via the SC signal from the serializer 155, two separate video samples are shifted out. The serializer 155, described below, takes these two samples and presents them sequentially. The rate at which video samples are shifted out of the VRAMs is completely independent of the rate at which video samples are put in, being limited only by the maximum serial clock frequency of the devices, which is typically 25 MHz or higher. This is the primary advantage of using VRAMSs as the video buffer, since the host's high-resolution display will in general be completely asynchronous from the incoming digital video data. Again, the effective data rate of the VRAM serial outputs is twice the serial shift clock (SC) frequency, due to the 2:1 interleaving. For output video data rates in excess of 50MHz, higher interleaving ratios or deeper buffer organizations are again required.

SERIALIZER 155

Figure 11:
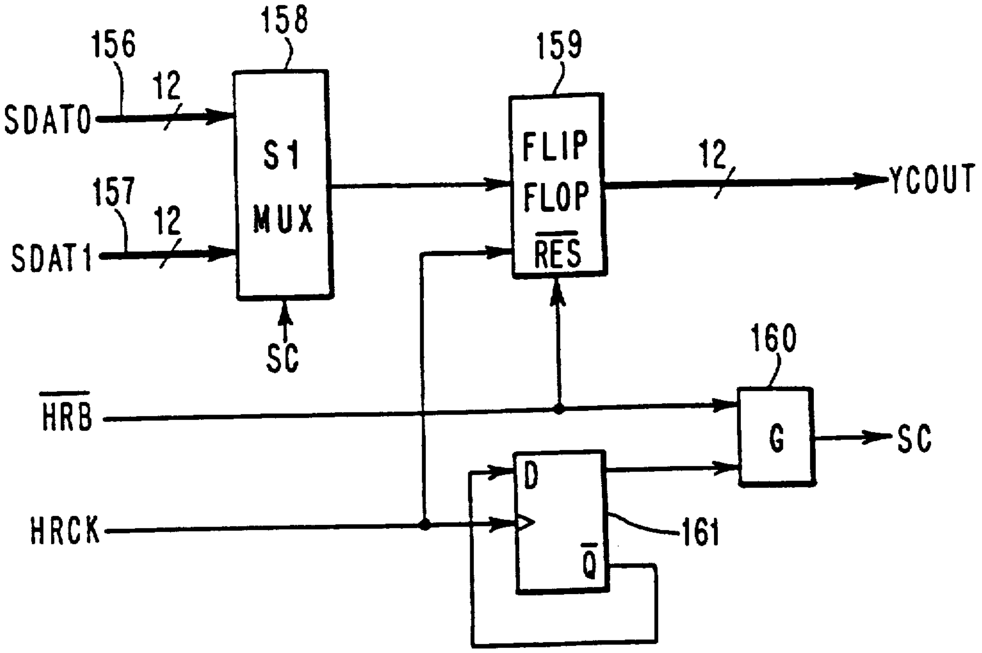
FIG. 11 is a block diagram of the serializer shown generally in FIG. 3.

The serializer 155, shown in FIG. 11, takes the incoming serial data from the Video Buffer 145 along 2 parallel 12-bit paths, SDAT0 on line 156 and SDAT1 on line 157, and serializes them by a multiplexor 158, shifting them out onto the high-speed Luminance-Chromenance output data bus (YCOUT) one 12-bit sample at a time by flip-flop 159. The YCOUT is clocked synchronously with the host's high resolution display dot clock (HRCK). In the present embodiment, it is clocked using the same signal. This clock frequency can be increased by some fractional amount while remaining synchronous with HRCK using conventional phase-locked loop techniques. This may be necessary, for example, to correct the aspect ratio of the video image on the high-resolution screen. There is also a high-resolution blanking signal (HRB-), which is used to force the YCOUT data to 0 (black) and also to delay the start of clocking data out of the Video Buffer's serial ports (via SC) from gate 160 as controlled by flip-flop 161, until the active portion of the high-resolution scanline starts.

COLOR KEY 165

Figure 12:
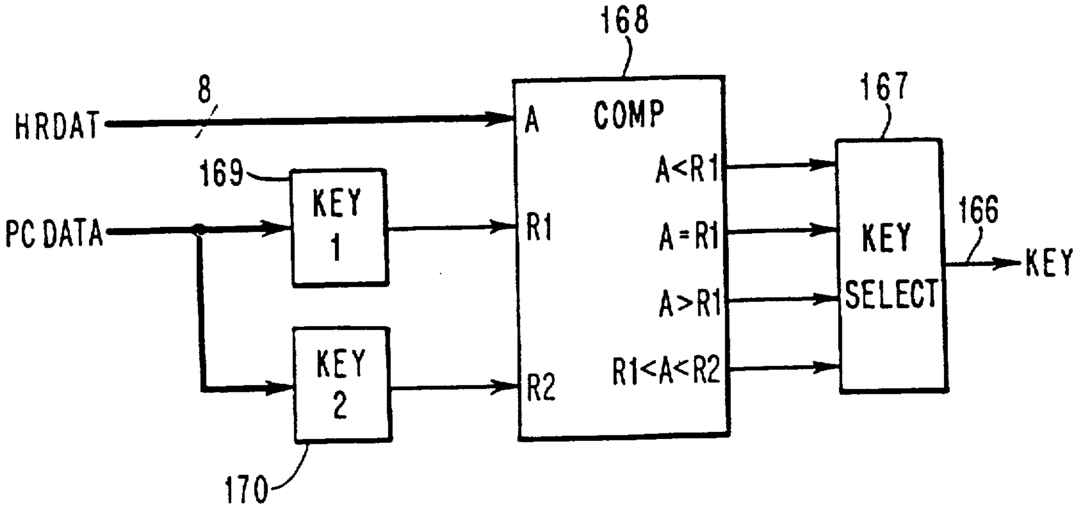
FIG. 12 is a block diagram of the color key network shown generally in FIG. 3.

The Color Key circuit 165, shown in FIG. 12, is used to generate a keying signal (KEY) on output line 166, which in turn is used by the digital TV output circuitry 500 to switch between TV video pixels (from the YCOUT bus) and the pixels from the host's high-resolution graphics controller. With reference to FIG. 2, every pixel during which KEY is asserted is seen on the monitor as video from the TV frame buffer 720, while those during which KEY is low are seen as video from the high-resolution frame buffer 760.

The KEY signal on line 166 from key select logic 167 is determined in comparator 168 by comparing the incoming high-resolution pixel with two pre-defined colors set by the host computer as manifested by Key 1 logic 169 and Key 2 logic 170. If the incoming pixel is between the two programmed values ($R1<A<R2$), the key signal is asserted This allows a range of colors to be specified for which video will be overlayed. If it is desired to have only one specific color overlayed with video, the KEY signal should be derived from the $A=R1$ comparator 168 output and R1 should be programmed with the keying color.

Several interesting effects can be obtained by using different outputs of the comparator 168. For example, if the $A<R1$ output is used, all high-resolution pixels having a value less than R1 are seen as video. By painting a graphics object with concentric rings of increasing color value, interesting "growing" and "shrinking" window effects can be achieved by dynamically varying the threshold value, R1.

DIGITAL AUDIO CIRCUIT 400

Figure 13:
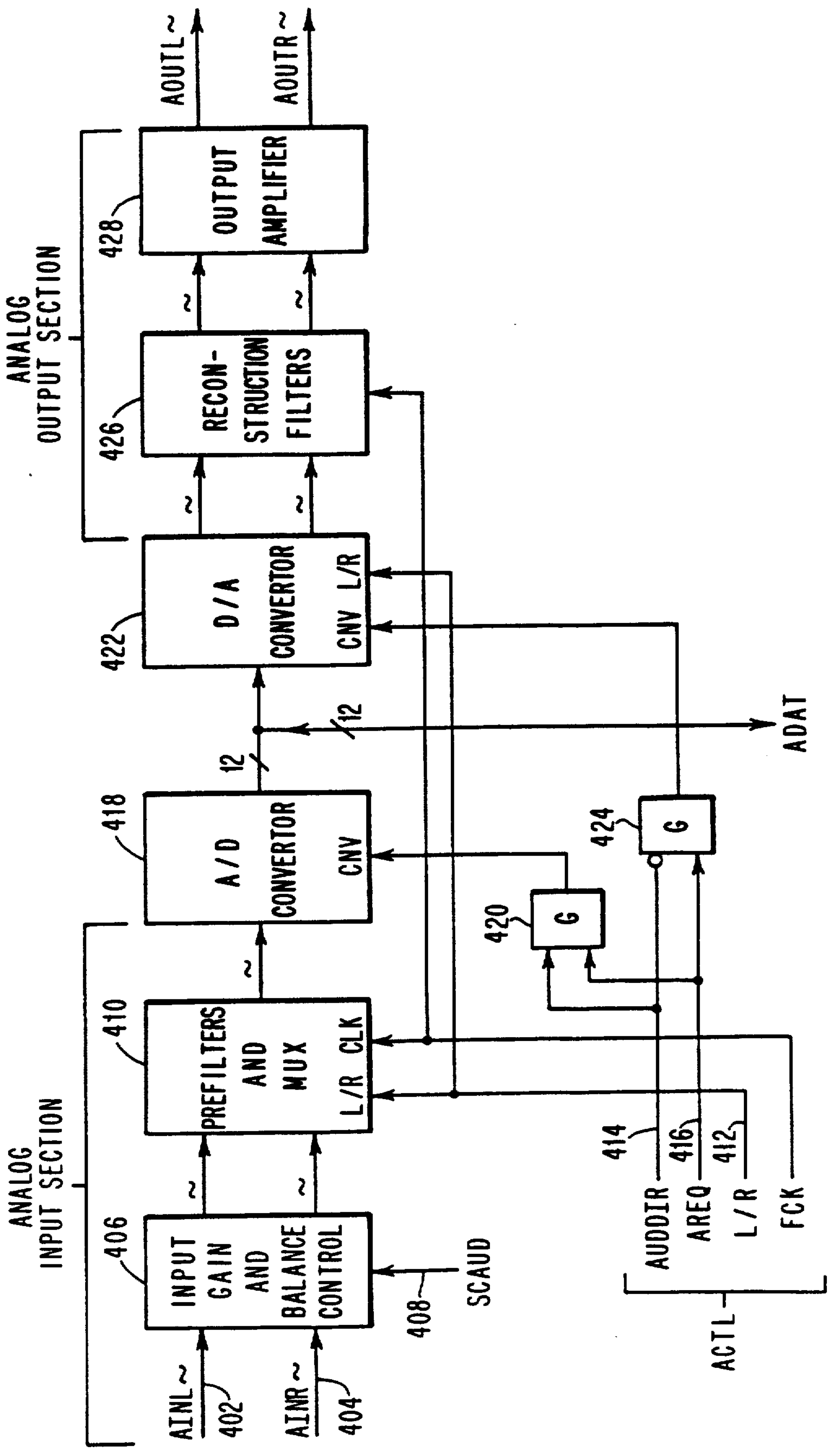
FIG. 13 is a block diagram of the digital audio circuitry shown generally in FIG. 1.

This circuitry, shown in FIG. 13, serves as the audio Input/Output subsystem in the system. The incoming analog stereo audio (AINL 402 and AINR 404) signals to input gain and balance control circuit 406 are first gain and balance adjusted appropriately and are subsequently low-pass prefiltered, so that they contain no frequency content above the Nyguist Frequency. The gain and balance can be controlled by the host computer 300 via the 2-bit serial data bus 408 (SCAUD).

Once the signals have been conditioned, they must be multiplexed onto a common wire by a multiplexor 410, in order to avoid the need for two separate Analog-to-Digital (A/D) convertors. Every other audio sample written into the video buffer comes from alternating channels of the incoming audio source. This toggling is performed via the L/R signal 412 generated by the sync generator 105. The sync generator 105 also generates the basic timing pulses for the audio conversion processes. When the digital audio data is being recorded, (AUDDIR=0) on line 414, the timing pulses (AREQ) on line 416 are applied only to the A/D convertor 418 via gate 420. Similarly, if AUDDIR×1 (playback mode) on line 414, AREQ on line 416 are only be applied to the Digital-to-Analog convertor (DAC) 422 via gate 424. Each time one of the convertors 418 or 422 receives a convert pulse, it provides one sample of audio (A/D), or take one sample and convert it to analog (DAC). These audio samples are read from or written to off-screen regions of the Video Buffer by the memory controller.

The DAC used in this system is actually a dual channel DAC, taking a single digital input and providing two analog outputs. The two output voltages are updated on every other DAC conversion cycle, in a similar manner to the A/D. After the DAC, there is once again analog audio, which must be processed through a reconstruction filter 426 in order to remove unwanted artifacts of the sampling process (i.e. quantization noise) This reconstruction filter has a cutoff frequency identical to that of the input filter. The cutoff frequency is controlled by the frequency of the FCK signal from the Sync Generator 105. Thus, a range of sample rates (hence cutoff frequencies) can be accommodated. Finally, there is an output amplifier 428, to restore the signals to a level sufficient to drive an audio pre-amp or headphones.

An interesting additional feature of this circuit is the ability to monitor the digital audio through the DAC as it is being recorded from the A/D. This can be done by driving both the A/D and DAC convert pulses simultaneously, which requires an obvious change in the logic shown in FIG. 13. This feature is a result of the fact that the A/D and DAC share a common data bus (ADAT).

DIGITAL TV INPUT CIRCUIT 200

Figure 14:
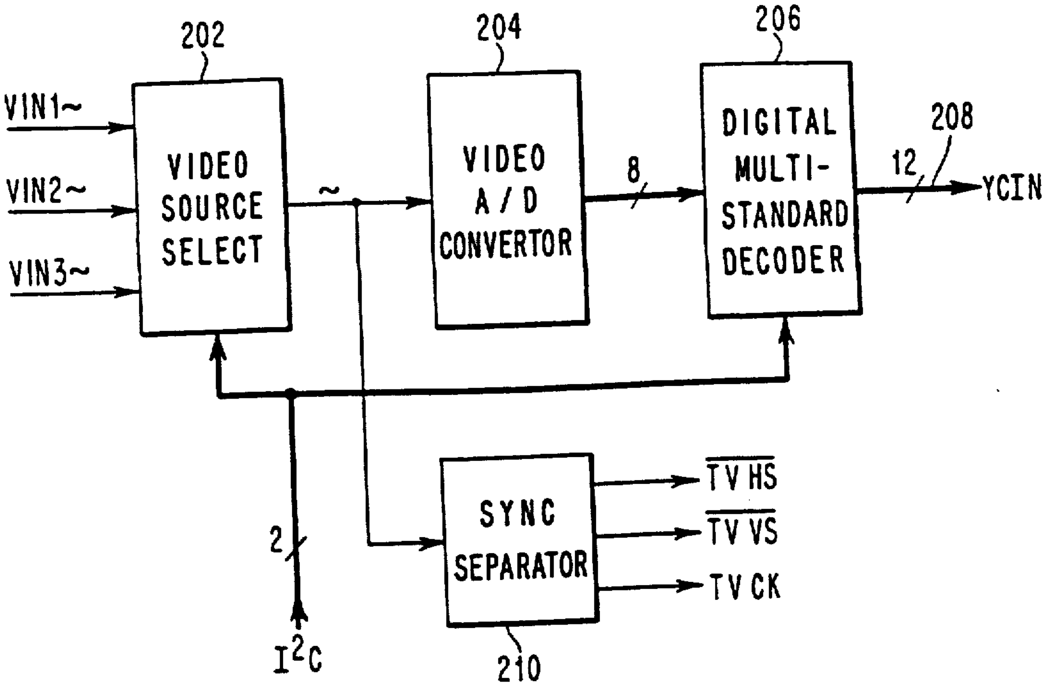
FIG. 14 is a block diagram of the digital TV input circuitry shown generally in FIG. 1.

FIG. 14 shows a typical system for providing the digital video input processed by the rest of the system. The video input can be selected by a video source select logic 202 from one of several sources under host control through the use of a $I^2C$ serial control bus. (This bus is standard for control Philips chips and described in Signetics/Philips data books as previously referenced). In addition, these sources can be any of a variety of formats including PAL, NTSC, SECAM, SVHS,RGB, etc. This is a virtue of the digital television approach, since these devices have been designed with that flexibility in mind. After a source is selected, it is digitized using a conventional video A/D convertor 204. An 8 bit digital output is shown, but again, this is not a fundamental limitation, and higher resolutions provided by future systems can be readily accommodated. This digitized video is then processed by a Digital Multi-Standard Decoder (DMSD) 206, driving a 12-bit digital Luminance/Chrominance Input Bus (YCIN) 208 at the TV data rate (TVCK). It is the DMSD 206 that interprets the variety of input video formats and decodes them appropriately. Various parameters of the decoder can be adjusted via the serial control bus $I^2C$.

A Sync Separator circuit 210 simply extracts Sync and Clock information from the currently selected video input and provides this information (TVVS-, TVHS-,TVCK) to the rest of the system.

DIGITAL TV OUTPUT CIRCUIT 500

Figure 15:
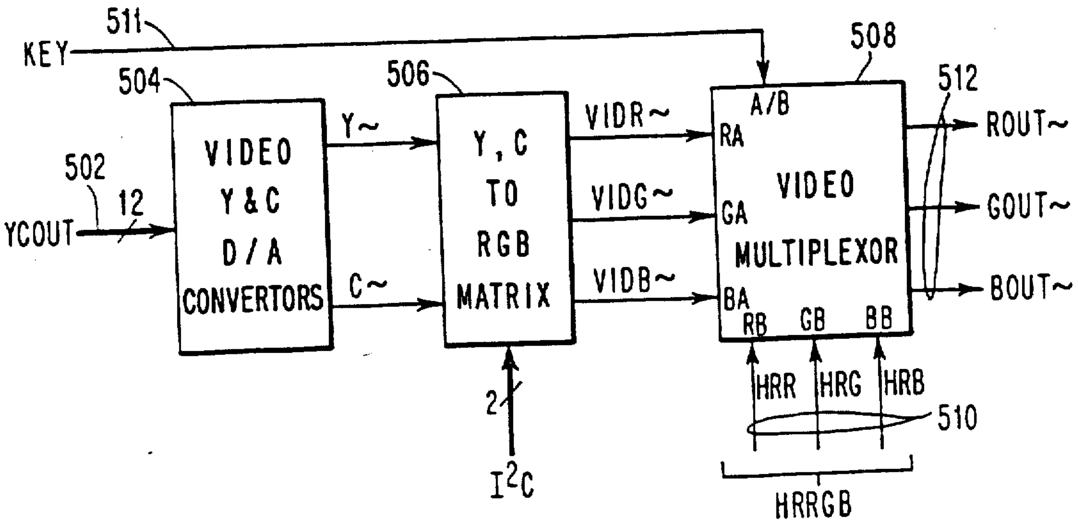
FIG. 15 is a block diagram of the digital TV output circuitry shown generally in FIG. 1.

This circuit, shown in FIG. 15, converts the high-speed Luminance/Chrominance Bus (YCOUT) information on line 501 back to analog RGB form by a convertor 504 and video Y and C to RGB matrix 506, and multiplexes it in a multiplexer 508 with RGB signals 510 from the host's high-resolution graphics controller, under control of the KEY signals on line 511.

The Y/C to RGB Matrix 506 is a purely analog component which converts the analog Y/C representation to RGB using a standard conversion matrix. Various adjustments to the output video (Saturation, Contrast, and Brightness) can be made by the host via the serial control bus $I^2C$.

Finally, the Video Multiplexor 508 selects between the RGB-converted video and the RGB from the high-resolution display controller, on a pixel by pixel basis. This selection is done under control of the KEY signal on line 511 generated by the Color Key circuit of FIG. 12. The output 512 of the multiplexor 508 directly drives the high-resolution display 600.

What is claimed is:

1. In a high resolution video display system, the combination comprising:

a high resolution display having a given scanline rate;

a computer for generating control signals, and video graphics signals;

an input device for receiving standard analog TV signals including a TV clock signal, and converting them to standard digital TV signals;

a display controller which operates under control of said control signals from said computer, said display controller including a two port display frame buffer, including means for reading said standard digital TV signals into said first port at a rate controlled by said TV clock signal and during a first time interval as controlled by said control signals from said computer for storage at predetermined locations of said display frame buffer, and including means for reading said video graphics signals into the first port at a rate controlled by said control signals from said computer and during a second time interval as controlled by said control signals from said computer for storage at predetermined locations of said display frame buffer, and including means for reading out said display frame buffer from the second port pel by pel and scanline by scanline at a rate compatible with the given scanline rate of said high resolution display, as controlled by said control signals from said computer; and an output device including a digital to analog converter for converting the signal read out of the second port of said display frame buffer to an analog display signal, for display on said high resolution display.

2. In a high resolution video display system, the combination comprising:

a high resolution display having a given scanline rate;

a computer for generating control signals, video graphics signals, and digitized audio signals;

an input device for receiving standard analog TV signals including a TV clock signal and converting them to standard digital TV signals;

a display controller which operates under control of said control signals from said computer, said display controller including a display frame buffer which includes an on screen portion and an off screen portion, including means for reading said standard digital TV signals into predetermined locations of said on screen portion of said display frame buffer at a rate controlled by said TV clock signal and during a first time interval as controlled by said control signals from said computer and including means for reading said video graphics signals into predetermined locations of said on screen portion of said display frame buffer at a rate controlled by said control signals from said computer and during a second time interval as controlled by said control signals from said computer, including means for reading said digitized audio signals into and out of said off screen portion of said display frame buffer in response to said control signals from said computer and including means for reading out said on screen portion of said display frame buffer scanline by scanline at a rate compatible with the given scanline rate of said high resolution display, as controlled by said control signals from said computer;

an audio circuit responsive to the digitized audio signals read out of said display frame buffer, including means for converting the digitized audio to analog audio for provision to a speaker; and an output device including a digital to analog converter for converting the standard TV signal and the video graphics signals read out of said display frame buffer to an analog TV signal, for display on said high resolution display.

3. In a high resolution video display system, the combination comprising:

a high resolution display having a given scanline rate at which data can be written on the face of said display;

a computer system for generating computer control signals, and computer data signals which include graphics data signals, and digitized audio data signals;

an input device for receiving standard analog TV signals including a TV clock signal and converting them to standard digital TV signals;

a display controller which operates under control of said computer control signals from said computer system, said display controller including a two port data buffer which includes an on screen portion and an off screen portion, including means for reading said standard digital TV signals into said first port at a rate controlled by said TV clock signal and during a first time interval as controlled by said computer control signals for storage at predetermined locations of said on screen portion of said data buffer, including means for reading said computer data signals into the first port for storage of the graphics data signals in predetermined locations in said on screen portion of said data buffer at a rate controlled by said computer control signals from said computer system during a second time interval as controlled by said computer control signals from said computer system, including means for reading said digitized audio data signals into said off screen portion of said data buffer, including means for reading said digitized audio data signals out of said first port under control of said computer control signals and including means for reading out said on screen portion of said data buffer from said second port scanline by scanline at a rate compatible with the given scanline rate of said high resolution display system as controlled by said computer control signals;

an audio circuit responsive to the digitized audio data signals read out of the first port of said display frame buffer, including means for converting the digitized audio data signals to analog audio for provision to a speaker; and an output device including a digital to analog converter for converting the standard TV signal sand the graphics data signals read out of the second port of said data buffer to an analog display signal, for display on said high resolution display.

4. In a high resolution video display system, the combination comprising:

a high resolution display having a given scanline rate at which data can be written on the face of said display;

a computer system for generating control signals, video graphics signals, and first digitized audio signals;

an input device for receiving standard analog TV signals including a TV clock signal and converting them to standard digital TV signals;

a display controller which operates under control of said control signals from said computer system, said display controller including a display frame buffer which includes an on screen portion and an off screen portion, including means for reading said standard digital TV signals from storage in predetermined locations of said on screen portion of said display frame buffer at a rate controlled by said TV clock signal during a first time interval as controlled by said control signals from said computer system, including means for reading said video graphics signals for storage in predetermined locations in said on screen portion of said display frame buffer at a rate controlled by said control signals from said computer system during a second time interval as controlled by said control signals from said computer system, including means for reading said first digitized audio signals for storage in first predetermined locations of said off screen portion of said display frame buffer, including means for reading said first digitized audio signals out of said off screen portion of said display frame buffer under control of said computer signals, and including means for reading out said on screen portion of said display frame buffer scanline by scanline at a rate compatible with the given scanline rate of said high resolution display system as controlled by said control signals from said computer system;

a source of analog audio signals;

and audio circuit including means for converting said analog audio signals to second digitized audio signals including means for reading said second digitized audio signals into second predetermined locations of the off screen portion of said display frame buffer including means for selectively reading out each of said first and second digitized audio signals under control of said control signals from said computer system with said audio circuit being responsive to either the first digitized audio signals or the second digitized audio signals read out of said display frame buffer, including means for converting the digitized audio to analog audio for provision to a speaker; and an output device including a digital to analog converter for converting the standard TV signal and the video graphics signals read out of said display frame buffer to an analog signal, for display on said high resolution display.

5. In a high resolution video display system, the combination comprising:

a high resolution display having a given scanline rate at which data can be written on the face of said display;

a computer system for generating computer control signals, and computer data signals which include graphics data signals, and first digitized audio data signals;

an input device for receiving standard analog TV signals including a TV clock signal and converting them to standard digital TV signals;

a display controller which operates under control of said computer control signals from said computer system, said display controller including a two port data buffer which includes and on screen portion and an off screen portion, including means for reading said standard digital TV signals into said first port at a rate controlled by said TV clock signal during a first time interval as controlled by said control signals from said computer system, for storage at first predetermined locations in said on screen portion of said data buffer, including means for reading said computer data signals into the first port for storage of the graphics data signals in second predetermined locations in said on screen portion of said data buffer at a rate controlled by said computer control signals from said computer system during a second time interval as controlled by said control signals from said computer system, including means for reading said first digitized audio data signals for storage in first off screen portions of said off screen portion of said data buffer, including means for reading said first digitized audio data signals out of said first port under control of said computer control signals, and including means for reading out said on screen portion of said data buffer from said second port scanline by scanline at a rate compatible with the given scanline rate of said high resolution display system as controlled by said computer control signals;

a source of analog audio TV signals;

an audio circuit including means for converting said analog audio TV signals to second digitized audio signals including means for reading said second digitized audio signals into the first port of said data buffer for storage at second predetermined locations of said off screen portion, including means for selectively reading out each of said first and second digitized audio signals from said first and second predetermined locations, respectively, out of said first port under control of said control signals with said audio circuit being responsive to either the first digitized audio data signals or the second digitized audio signals read out of the first port of said data buffer, including means for converting the digitized audio signals read out of said first port to analog audio for provision to a speaker; and an output device including a digital to analog converter for converting the standard TV signal and the graphics data signals read out of the second port of said data buffer to an analog display signal, for display on said high resolution display.

6. In a high resolution video display system, the combination comprising:

a high resolution display having a given scanline rate;

a computer system for generating control signals, and video graphics signals;

an input device for receiving standard analog TV signals including a TV clock signal, and converting them to standard digital TV signals;

a display controller which operates under control of said control signals from said computer system, said display controller including a two port display frame buffer, including means for reading said standard digital TV signals into said first port at a rate controlled by said TV clock signal and during a first time interval as controlled by said control signals from said computer system for storage at predetermined locations of said display frame buffer, and including means for reading said video graphics signals into the first port at a rate controlled by said control signals from said computer system and during a second time interval as controlled by said control signals from said computer system for storage at predetermined locations of said display frame buffer, and including means for reading out said display frame buffer from the second port pel by pel and scanline by scanline at a rate compatible with the given scanline rate of said high resolution display, as controlled by said control signals from said computer system;

a high resolution frame buffer for storing computer graphic signals, including means for reading out said computer graphic signals at a rate controlled by said control signals;

means for converting the computer graphic signals to an analog high resolution computer graphics signal;

means for converting the signal read out of the second port of said display frame buffer to an analog display signal; and means for selecting one of said analog high resolution computer graphic signals and said analog display signal for display on said high resolution display.

7. In a high resolution video display system, the combination comprising:

a high resolution display having a given scanline rate;

a computer system for generating control signals, video graphics signals, and digitized audio signals;

an input device for receiving standard analog TV signals including a TV clock signal and converting them to standard digital TV signals;

a display controller which operates under control of said control signals from said computer system, said display controller including a display frame buffer which includes an on screen portion and an off screen portion, including means for reading said standard digital TV signals into predetermined locations of said on screen portion of said display frame buffer at a rate controlled by said TV clock signal and during a first time interval as controlled by said control signals from said computer system and including means for reading said video graphics signals into predetermined locations of said on screen portion of said display frame buffer at a rate controlled by said control signals from said computer system and during a second time interval as controlled by said control signals from said computer system, including means for reading said digitized audio signals into and out of said off screen portion of said display frame buffer in response to said control signals from said computer system and including means for reading out said on screen portion of said display frame buffer scanline by scanline at a rate compatible with the given scanline rate of said high resolution display, as controlled by said control signals from said computer system;

a high resolution frame buffer for storing computer graphic signals, including means for reading out said computer graphic signals at a rate controlled by said control signals;

means for converting said computer graphic signals to analog high resolution graphic signals;

means for converting the standard TV signal and the video graphics signals read out of said TV frame buffer to an analog display signal;

means for selecting one of said analog high resolution graphic signals and said analog display signal for display on said high resolution display; and an audio circuit responsive to the digitized audio signals read out of said display frame buffer, including means for converting the digitized audio to analog audio for provision to a speaker.

8. In a high resolution video display system, the combination comprising:

a high resolution display having a given scanline rate at which data can be written on the face of said display;

a compute system for generating computer control signals, and computer data signals which include graphics data signals, and digitized audio data signals;

an input device for receiving standard analog TV signals including a TV clock signal, and converting them to standard digital TV signals;

a display controller which operates under control of said control signals from said computer system, said displays controller including a two port data buffer which includes an on screen portion and an off screen portion, including means for reading said standard digital TV signals into predetermined locations of said on screen portion of said data buffer at a rate controlled by said TV clock signal and during a first time interval as controlled by said control signals from said computer system and including means for reading said computer data signals into the first port for storage of the graphics data signals in predetermined locations in said on screen portion of said data buffer at a rate controlled by said computer control signals from said computer system during a second time interval as controlled by said computer control signals from said computer system, including means for reading said digitized audio data signals into said off screen portion of said data buffer including means for reading said digitized audio data signals out of said first port under control of said computer control signals and including means for reading out said on screen portion of said data buffer from said second port scanline by scanline at a rate compatible with the given scanline rate of said high resolution display system as controlled by said computer control signals;

a high resolution frame buffer for storing computer graphic signals, including means for reading out said computer graphic signals at a rate controlled by said computer system;

means for converting said computer graphic signals to analog high resolution graphic signals;

means for converting the standard TV signal and the graphics data signals read out of the second port of said data buffer to an analog display signal;

means for selecting one of said analog high resolution graphics signal and said analog signal display signal for display on said high resolution display; and an audio circuit responsive to the digitized audio data signals read out of the first port of said data buffer, including means for converting the digitized audio data signals to analog audio for provision to a speaker.

9. In a high resolution video display system, the combination comprising:

a high resolution display having a given scanline rate at which data can be written on the face of said display;

a computer system for generating control signals, video graphics signals, and first digitized audio signals;

an input device for receiving standard analog TV signals including a TV clock signal and converting them to standard digital TV signals;

a display controller which operates under control of said control signals from said computer system said display controller including a display frame buffer which includes an on screen portion and an off screen portion, including means for reading said standard digital TV signals for storage in predetermined locations of said on screen portion of said display frame buffer at a rate controlled by said TV clock signal during a first time interval as controlled by said control signals from said computer system, including means for reading said video graphics signal for storage in predetermined locations in said on screen portion of said display frame buffer at a rate controlled by said control signals from said computer system during a second time interval as controlled by said control signals from said computer system, including means for reading said first digitized audio signals for storage in first predetermined locations of said off screen portion, including means for reading said first digitized audio signals out of said off screen portion of said display frame buffer under control of said computer control signals, and including means for reading out said on screen portion of said display frame buffer scanline by scanline at a rate compatible with the given scanline rate of said high resolution display system as controlled by said control signals from said computer system;

a high resolution frame buffer for storing computer graphic signals, including means for reading out said computer graphic signals at a rate controlled by said control signals from said computer system;

means for converting said computer graphic signals to analog high resolution graphic signals;

means for converting the standard TV signal and the video graphics signals read out of said display frame buffer to an analog display signal;

means for selecting one of said analog high resolution computer graphic signals and said analog display signal for display on said high resolution display;

a source of analog audio signals;

an audio circuit including means for converting said analog audio signals to second digitized audio signals including means for reading said second digitized audio signals into second predetermined locations of the off screen portion of said display frame buffer including means for selectively reading out each of said first and second digitized audio signals under control of said control signals from said computer system with said audio circuit being responsive to either the first digitized audio signals or the second digitized audio signals read out of the off-screen portion of said display frame buffer, including means for converting the digitized audio to analog audio for provision to a speaker.

10. A high resolution display having a given scanline rate;

a computer system for generating control signals, and video graphics signals;

an input device for receiving standard analog TV signals including a TV clock signal, and converting them to standard digital TV signals;

means for selecting a window of said standard digital TV signals;

a display controller which operates under control of said control signals from said computer system, said displays controller including a two port display frame buffer, including means for reading said window of standard digital TV signals into said first port at a rate controlled by said TV clock signal and during a first time interval as controlled by said control signals from said computer system for storage at predetermined locations of said display frame buffer, and including means for reading said video graphics signals into the first port at a rate controlled by said control signals from said computer and during a second time interval as controlled by said control signals from said computer for storage at predetermined locations of said display frame buffer, and including means for reading out said display frame buffer from the second port pel by pel and scanline by scanline at a rate compatible with the given scanline rate of said high resolution display, as controlled by said control signals from said computer system; and an output device including a digital to analog converter for converting the signal read out of the second port of said display frame buffer to an analog display signal, for display on said high resolution display.

* * * * *